(12) United States Patent
Dickie

(10) Patent No.: US 9,760,599 B2
(45) Date of Patent: *Sep. 12, 2017

(54) GROUP-BY PROCESSING FOR DATA CONTAINING SINGLETON GROUPS

(71) Applicant: International Business Machines Corporation, Armonk, NY (US)

(72) Inventor: Garth A. Dickie, Framingham, MA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 525 days.

This patent is subject to a terminal disclaimer.

(21) Appl. No.: 14/248,492

(22) Filed: Apr. 9, 2014

(65) Prior Publication Data
US 2015/0293967 A1    Oct. 15, 2015

(51) Int. Cl.
*G06F 17/30* (2006.01)

(52) U.S. Cl.
CPC .. *G06F 17/30412* (2013.01); *G06F 17/30371* (2013.01)

(58) Field of Classification Search
CPC ............... G06F 17/30371; G06F 17/30412
See application file for complete search history.

(56) References Cited

U.S. PATENT DOCUMENTS

| | | | |
|---|---|---|---|
| 5,598,559 A | 1/1997 | Chaudhuri | |
| 6,996,577 B1 | 2/2006 | Kiran et al. | |
| 7,966,291 B1 | 6/2011 | Petrovic et al. | |
| 8,086,597 B2 | 12/2011 | Balmin et al. | |
| 8,412,712 B2 | 4/2013 | Caceres | |
| 8,473,918 B2 | 6/2013 | Acedo et al. | |
| 8,516,008 B1* | 8/2013 | Marquardt | G06F 17/30315 707/802 |
| 2008/0059412 A1* | 3/2008 | Tarin | G06F 17/30592 |
| 2011/0029976 A1 | 2/2011 | Patey et al. | |
| 2012/0054236 A1* | 3/2012 | Branscome | G06F 17/30519 707/770 |
| 2012/0209873 A1* | 8/2012 | He | G06F 17/30489 707/769 |

(Continued)

OTHER PUBLICATIONS

List of IBM Patent Applications Treated as Related, Mar. 12, 2015.

(Continued)

*Primary Examiner* — Taelor Kim
(74) *Attorney, Agent, or Firm* — Robert C. Bunker; SVL IPLaw Edell, Shapiro & Finnan, LLC

(57) ABSTRACT

According to one embodiment of the present invention, a system performs a grouping operation for a database query. The system assigns data elements to groups and aggregates information for a group in response to assigning the group two or more data elements. The system passes the aggregated information for a group of two or more data elements for processing in accordance with the query, and passes information for a data element of a single-member group in a received form for processing in accordance with the query. Embodiments of the present invention further include a method and computer program product for grouping data elements in substantially the same manners described above.

12 Claims, 4 Drawing Sheets

(56) References Cited

U.S. PATENT DOCUMENTS

| | | |
|---|---|---|
| 2012/0272225 A1 | 10/2012 | Thota et al. |
| 2013/0073537 A1 | 3/2013 | Simon et al. |
| 2013/0166281 A1 | 6/2013 | Lamy |
| 2013/0238548 A1 | 9/2013 | George |
| 2014/0372411 A1* | 12/2014 | Attaluri ............. G06F 17/30398 707/722 |

OTHER PUBLICATIONS

Eisenberg et al.; "Dependently Typed Programming With Singletons", Draft for Submission to Haskell 2012, Jul. 23, 2012, pp. 1-13.

ip.com et al.; "System Singleton for UNIX", IPCOM000028223D, May 5, 2004, pp. 1-6.

Bakibayer et al.; "FDB: A Query Engine for Factorized Relational Databases", Proceedings of the VLDB Endowment, vol. 5, No. 11, Aug. 27-31, 2012, pp. 1232-1243.

* cited by examiner

GROUP-BY PROCESSING FOR DATA CONTAINING SINGLETON GROUPS

BACKGROUND

Present invention embodiments relate to information management, and more specifically, to processing group-by operations when some or all of the groups have a single member.

In data warehouse and operational analytics database queries, group-by operations (e.g., operations specified in a Structured Query Language (SQL) statement containing a GROUP BY clause) that result in a large number of groups are commonplace. Grouping may be performed by sorting input records on the grouping keys and collapsing the groups, or by maintaining a hash table that maps the grouping keys to aggregation records. These operations consume large amounts of processing and memory resources.

SUMMARY

According to one embodiment of the present invention, a system performs a grouping operation for a database query. The system assigns data elements to groups and aggregates information for a group in response to assigning the group two or more data elements. The system passes the aggregated information for a group of two or more data elements for processing in accordance with the query, and passes information for a data element of a single-member group in a received form for processing in accordance with the query. Embodiments of the present invention further include a method and computer program product for grouping data elements in substantially the same manners described above.

BRIEF DESCRIPTION OF THE SEVERAL VIEWS OF THE DRAWINGS

Generally, like reference numerals in the various figures are utilized to designate like components.

DETAILED DESCRIPTION

Present invention embodiments relate to group-by operations where some or all of the resulting groups have a single member. Group-by operations aggregate information for groups of data objects having common values of a specified field or combination of fields. These values are referred to as grouping keys. For example, the SQL statement SELECT X, AVG(Y), MAX(Z) FROM T GROUP BY X specifies a group-by operation for rows of table T, where the grouping keys are the column X values, and the aggregated output includes the average of column Y values and the maximum column Z value for each distinct value of column X.

If the records being aggregated are already distinct in the grouping keys (e.g., if column X contains no duplicate values), the group-by operation has the effect of producing singleton groups, and the aggregation results (e.g., AVG(Y) and MAX(Z)) are each computed from a single value. If the grouping keys are known to be distinct ahead of time (e.g., because column X was declared UNIQUE), the query planner may rewrite the query to omit the group-by operation completely. In particular, the records do not need to be hashed or sorted, and the values on which the aggregation outputs depend do not need to be moved or accumulated into new aggregated data objects. However, the query planner may not know that the grouping keys will be distinct. For example, the grouping keys may be distinct by virtue of earlier operations in the query, and the planner may be unable to predict this result with certainty.

One aspect of a present invention embodiment is to improve the performance of group-by operations when some or all of the grouping keys are distinct, even when this cannot be established ahead of time. In particular, aggregation work may be postponed until a record is found that does not have a unique grouping key. The uniqueness of a key may be tested using a random memory access (e.g., a hash table probe) to a small memory area (e.g., an element in the hash table). Copying of data from an input data stream into aggregation records may be wholly or partially avoided. In addition, some (or all) of the input data stream may remain in an incoming compressed form. This enables downstream processing on the still-compressed data, which may itself provide a performance benefit (e.g., by reducing the volume of data that must be transferred to a downstream process).

Figure 1:
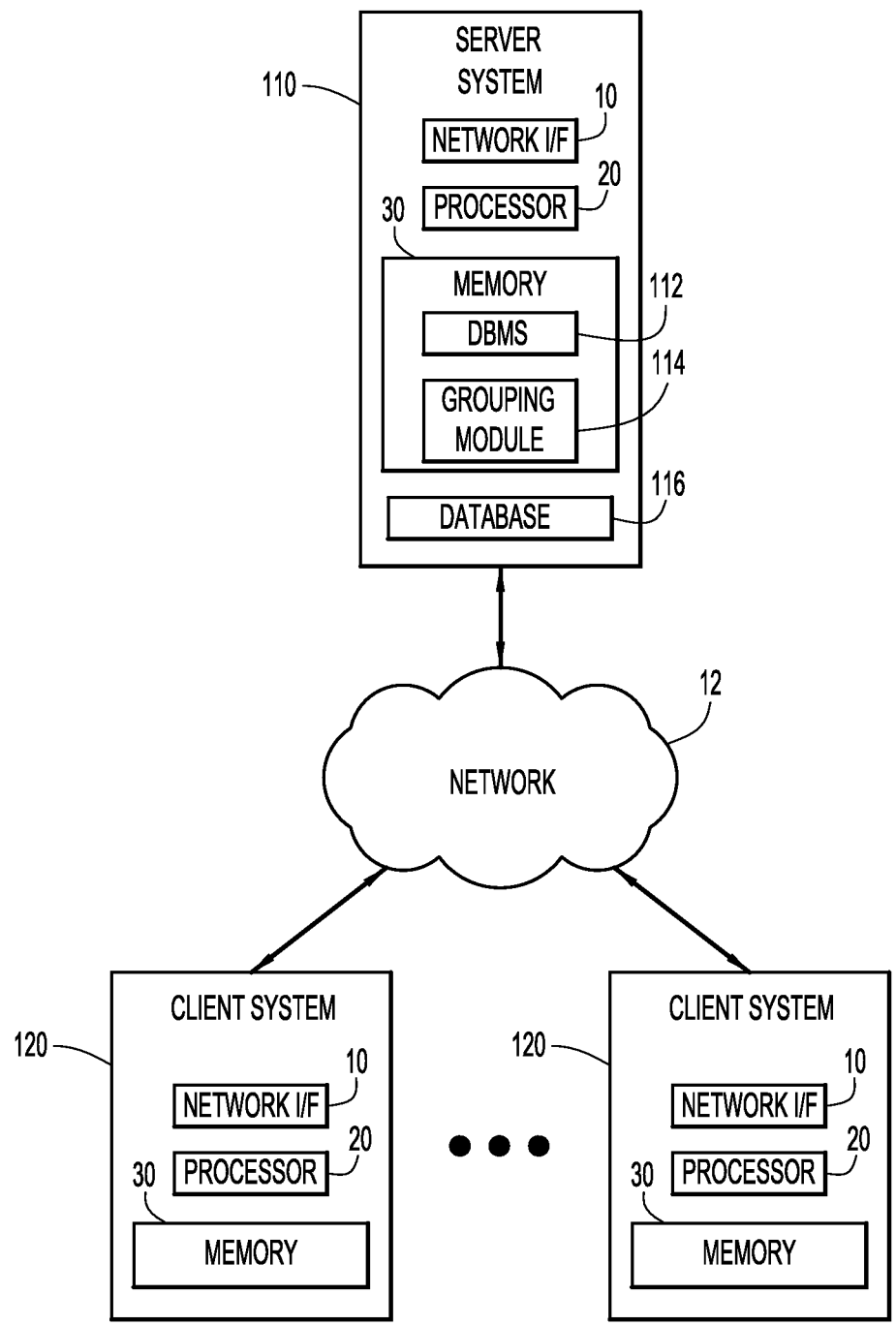
FIG. 1 is a diagrammatic illustration of an example environment for an embodiment of the present invention.

An example environment for present invention embodiments is illustrated in FIG. 1. Specifically, the environment includes server system 110, and one or more client or end-user systems 120. Server system 110 and client systems 120 may be remote from each other and communicate over a network 12. Network 12 may be implemented by any number of any suitable communications media (e.g., wide area network (WAN), local area network (LAN), Internet, intranet, etc.). Alternatively, any number of server systems 110 and/or client systems 120 may be local to each other, and communicate via any appropriate local communication medium (e.g., local area network (LAN), hardwire, wireless link, intranet, etc.).

Server system 110 may include database management system (DBMS) 112, grouping module 114, and database 116. The DBMS, grouping module, and database may be implemented across plural server systems. Alternatively, the DBMS, grouping module, and database may be may reside on a client system 120 or other computer systems (e.g., grouping module 114 may reside on processing units of a database accelerator system to which the DBMS delegates query execution).

Client systems 120 enable users to communicate with the DBMS (e.g., via network 12). The client systems may present any graphical user (e.g., GUI, etc.) or other interface (e.g., command line prompts, menu screens, etc.) to receive commands from users and interact with the DBMS and/or other modules or services.

Server systems 110 and client systems 120 may be implemented by any conventional or other computer systems, and may be equipped with a display or monitor, a base (e.g., including at least one processor 20, memories 30 and/or internal or external network interface or communications devices 10 (e.g., modem, network cards, etc.), optional input devices (e.g., a keyboard, mouse, or other input device), and any commercially available and custom software (e.g., database software, grouping module software, etc.).

The DBMS and grouping module may include one or more modules or units to perform the various functions of present invention embodiments described below (e.g., query planning/optimization, query execution, compression/decompression, data structure management, etc.), may be implemented by any combination of any quantity of software and/or hardware modules or units, and may reside within memory 30 of a server system, client system, and/or other computing system for execution by processor 20.

Figure 2:
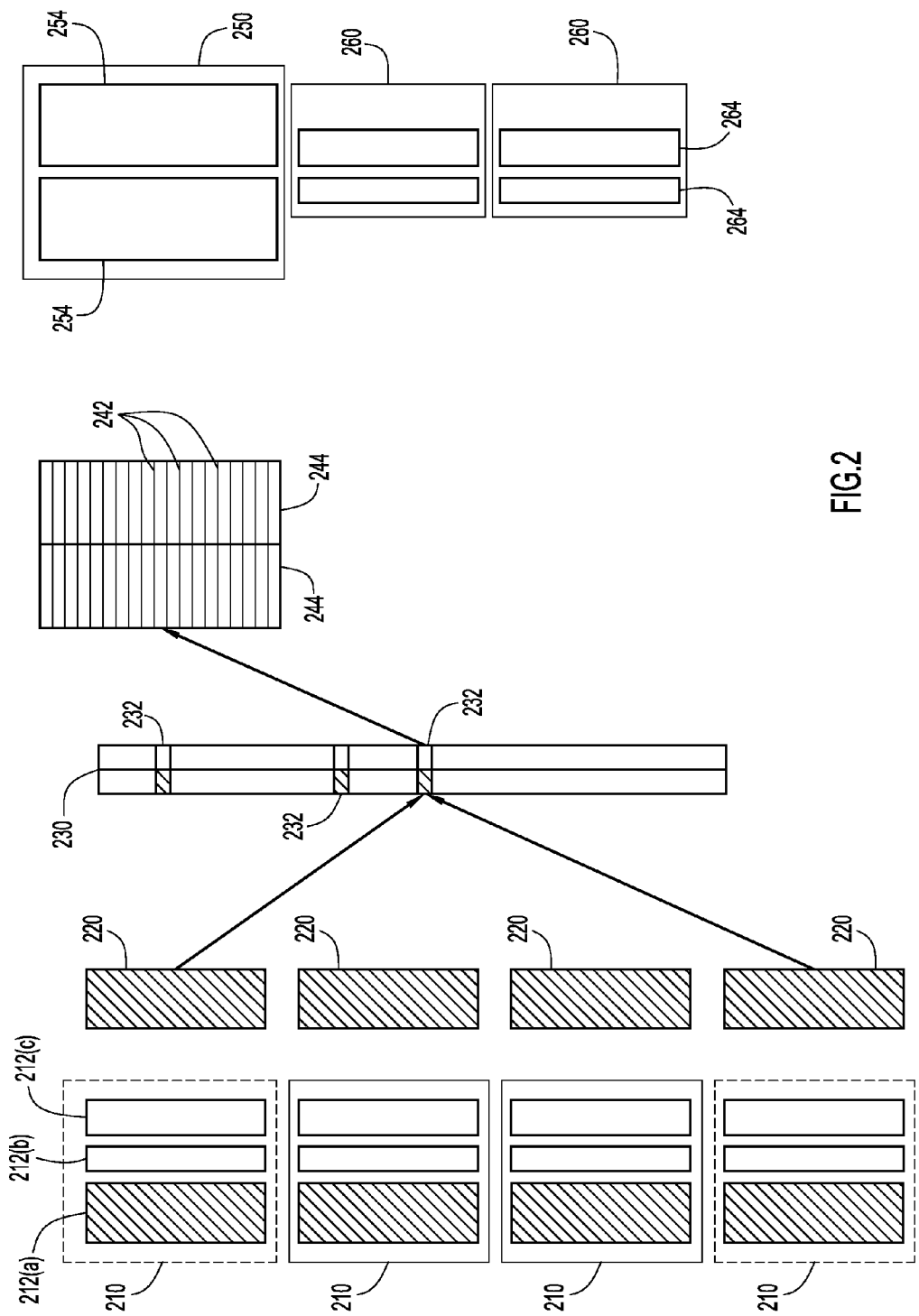
FIG. 2 is a diagrammatic illustration of example data structures used in processing a grouping operation according to an embodiment of the present invention.

Example data structures for processing a grouping operation according to an embodiment of the present invention are illustrated in FIG. 2. In particular, grouping module 114 may receive input in the form of one or more data blocks 210 and use digests 220, associative data structure 230, and aggregation records 242 to produce output comprising aggregated output 250 and/or non-aggregated output 260.

Each data block 210 comprises a set of input records. Each input record comprises one or more fields or columns (e.g., columns 212(a), 212(b), 212(c), etc.), any combination of which may define grouping keys for a group-by operation. Data may be arranged within a block in any manner (e.g., row-wise, column-wise, etc.) and may be in compressed form. For example, field values may be stored in a column-wise format, with different compression techniques (e.g., run-length compression, dictionary substitution, etc.) or combinations of compression techniques applied to different columns. Additional information (e.g., metadata describing block format, compression, fields, statistics, etc.) may be included within block 210 or provided separately to the grouping module, query planner, or other modules in any manner from any source.

Each digest 220 contains values (digest values) associated with corresponding grouping keys of a data block 210. The digest values may be used as indexes into associative data structure 230. Alternatively, digests 220 may be absent. For example, digest values may be computed individually when needed and discarded without being stored concurrently with one another.

Associative data structure 230 maps (e.g., via digest 220) grouping keys to associated elements 232. The associative data structure may be a hash table, and the digest values the results of applying a hash function to the grouping keys. Alternatively, associative data structure 230 may be a linear array if the grouping keys can be mapped to elements of the array without collisions between distinct grouping keys. For example, the grouping keys may have been declared as a data type representable by a fixed number of bits (e.g., 16, 20, 32, etc.) or may have a known range (e.g., integers between 1000 and 3000 or other minimum and maximum) such that an array with as many elements as possible distinct grouping keys may reside within available memory. The digest values may then be the grouping keys themselves (or a one-to-one function of the grouping keys), and may be used as array indexes without incurring the overhead of applying a hash function or handling collisions (e.g., the keys need not be stored in the data structure).

Each element 232 may comprise one or more items of information (e.g., type tags, references to other data objects, aggregation data, etc.). For example, an element 232 may include a type tag indicating that the element contains a reference to (or instance of) an aggregation record 242, a reference to an input record within a block 210, an indication that no information has been entered for a grouping key associated with that element, or the like.

Aggregation records 242 (sometimes referred to as "buckets") contain information about input records matching corresponding grouping keys. For example, an aggregation record may include fields 244 for accumulating statistics of matching input records used to produce aggregated output requested by a query (e.g., input record counts; grouping key values; column value sums, sums of squares, minimums, maximums, etc.; and the like). After all records are processed, accumulated counts, sums, or sums of squares may be combined to compute averages, standard deviations, variances, etc.

Aggregated output 250 and non-aggregated output 260 contain information about groups resulting from a group-by operation. For example, aggregated output 250 may contain aggregated information (e.g., grouping key, counts, sums, maximums, minimums, or other fields 254) about groups that may have more than one member, and non-aggregated output 260 may contain information about groups having a single member (e.g., fields 264, having a similar form corresponding to input record fields 212). Aggregated output 250 and non-aggregated output 260 may include data arranged in any manner (e.g., row-wise, column-wise, etc.) and may be in compressed form.

Figure 3:
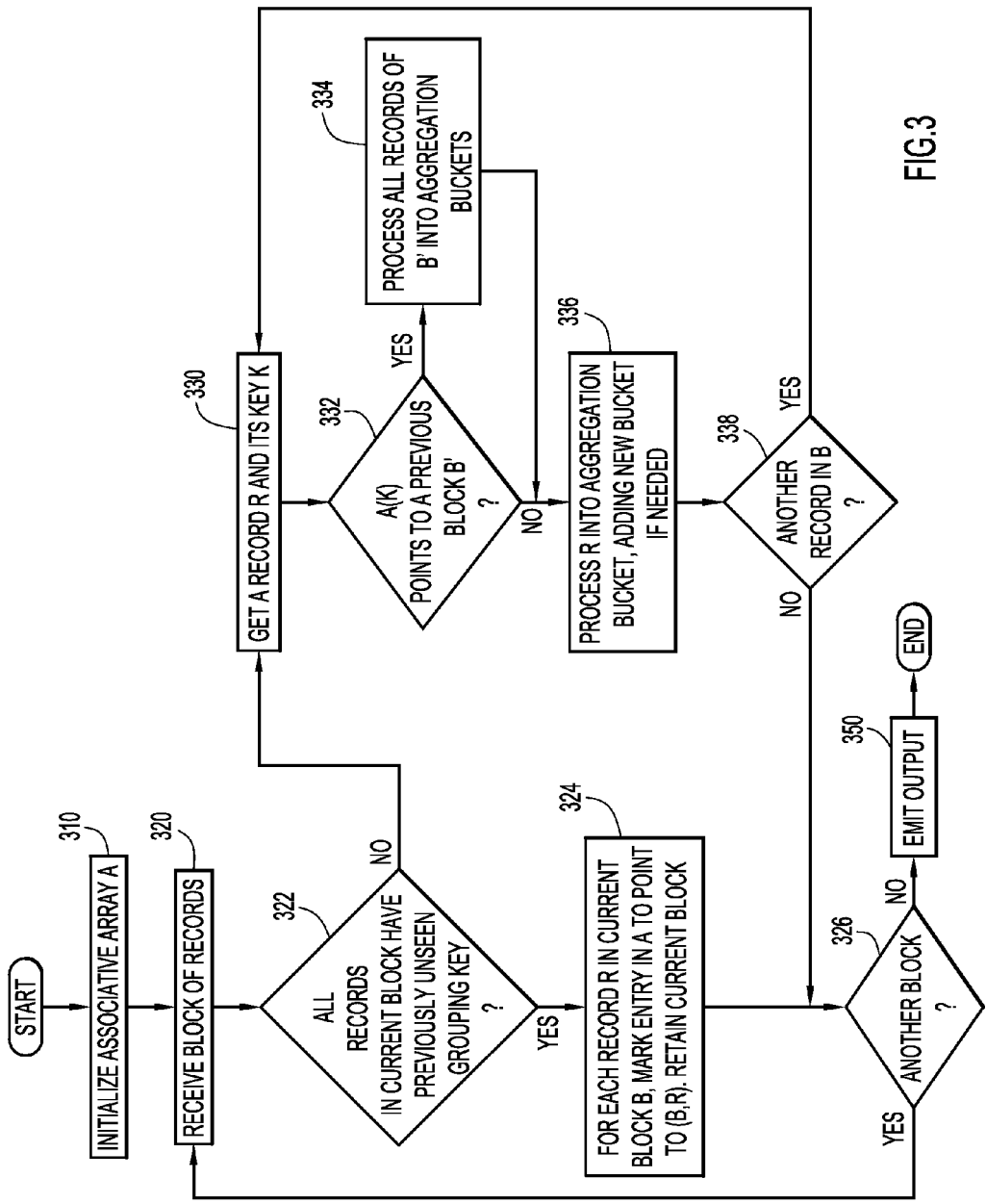
FIG. 3 is a flow diagram illustrating an example manner of processing a grouping operation according to an embodiment of the present invention.

An example manner of processing a grouping operation (e.g., via grouping module 114 and processor 20 of server system 110) according to an embodiment of the present invention is illustrated in FIG. 3. The grouping module initializes associative data structure 230 at step 310. The form of associative data structure 230 may be determined based on information about the grouping keys (e.g., by grouping module 114, a query planner, or other module). For example, the associative data structure may be a linear array if the digest values can be smaller than a predetermined size (e.g., 16 bits, 20 bits, 32 bits, etc.), and a hash table otherwise. Elements 232 of the associative data structure are initialized to indicate that no information has yet been entered. The associative data structure may grow as entries are added, with new entries initialized as they are added. Growth of the associative data structure may also be achieved by initializing a new larger data structure, then copying all entries from the existing smaller data structure.

The grouping module receives a data block 210 at step 320. In addition, the grouping module may generate or receive (e.g., from a previous stage of query execution) a digest 220 for the data block. At step 322, the grouping module determines whether all of the input records within the data block have previously unseen grouping keys. For example, for each input record in the data block, the grouping module may read the digest value from the digest (or read the grouping key from the data block and compute the digest value of the grouping key), and use the digest value to access the element 232 associated with the grouping key. The element indicates whether the grouping module has seen an input record with that grouping key in a previously received data block.

If none of the input records in the current data block have a grouping key seen in a previous data block, then, at step 324, for reach input record in the data block, the grouping module marks the corresponding element in the associative data structure with a pointer to the input data block. For example, the grouping module may write an identifier of the data block to the data element. The grouping module retains the data block. Processing then proceeds to step 326 and continues with the next data block (if any).

If any of the input records in the current data block have a grouping key seen in a previous data block at step 322, the grouping module processes all of the input records in the current data block into aggregation records 242. In particular, at step 330, the grouping module accesses an input record (R) from the current data block (B) and obtains the input record's grouping key (K). At step 332, the grouping module accesses the element 232 associated with the grouping key K and determines whether the element points to a previous data block (B').

At step 334, in response to finding an element that points to a previous data block B', the grouping module processes all input records from B' into aggregation records 242. For example, for each input record R' of data block B', the grouping module may allocate and initialize a new aggregation record, set the associative data structure element for the grouping key of R' to refer to the new aggregation record, and update the new aggregation record with information from R'(e.g., increment a record count, accumulate sums, etc.). The grouping module may discard (previously retained) data block B'. Processing then proceeds to step 336.

If the element does not point to a previous block at step 332 or after processing the previous block, the grouping module processes the input record R into an aggregation record at step 336. For example, if the associated data structure element for the grouping key K refers to an existing aggregation record, that aggregation record is updated with information from the current input record R. Otherwise, the grouping module may allocate and initialize a new aggregation record, set the associated data structure element to refer to the new aggregation record, and update the new aggregation record with information from the current input record.

At step 338, the grouping module determines whether another record of data block B remains to be processed. If so, processing returns to step 330. Otherwise, the grouping module may discard data block B and processing proceeds to step 326.

At step 326, the grouping module determines whether another data block remains to be processed. If so, processing returns to step 320, otherwise processing proceeds to step 350.

At step 350, the grouping module may emit aggregated output 250 and non-aggregated output 260 (e.g., for a subsequent stage of a query processing plan). For example, the grouping module may generate aggregated output 250 based on aggregation records 242. If the grouping keys are required as part of the output, then they have been stored as part of the aggregation record. Retained data blocks contain records belonging to singleton groups. These may be used to generate—or may be passed unchanged as—non-aggregated information 260. Generating aggregated output 250 and/or non-aggregated output may include reformatting (e.g., converting from row-oriented aggregation records to column-oriented aggregated output, dropping unused columns, etc.) and applying compression or decompression.

In other words, the grouping module processes blocks of records. The associative data structure may be used to find existing aggregation buckets for input records that match (in virtue of having the same grouping key) previously seen input records, and to identify new input records that have never-before-seen grouping keys, and for which an aggregation bucket may therefore not yet have been allocated or initialized. If any of the records in a block match existing buckets, the entire block of records is processed into aggregation buckets (e.g., in a conventional manner), adding new buckets where needed, aggregating into existing buckets otherwise. If while attempting to aggregate into an existing bucket, a reference to a block of previously-unprocessed records is found, then that entire chunk of records is processed into the aggregation buckets. At the end of aggregation processing, there are some aggregation records accessible through the hash table, and some chunks of unprocessed records held to the side, representing singleton buckets. The records held to the side may be emitted with minimal processing.

Figure 4:
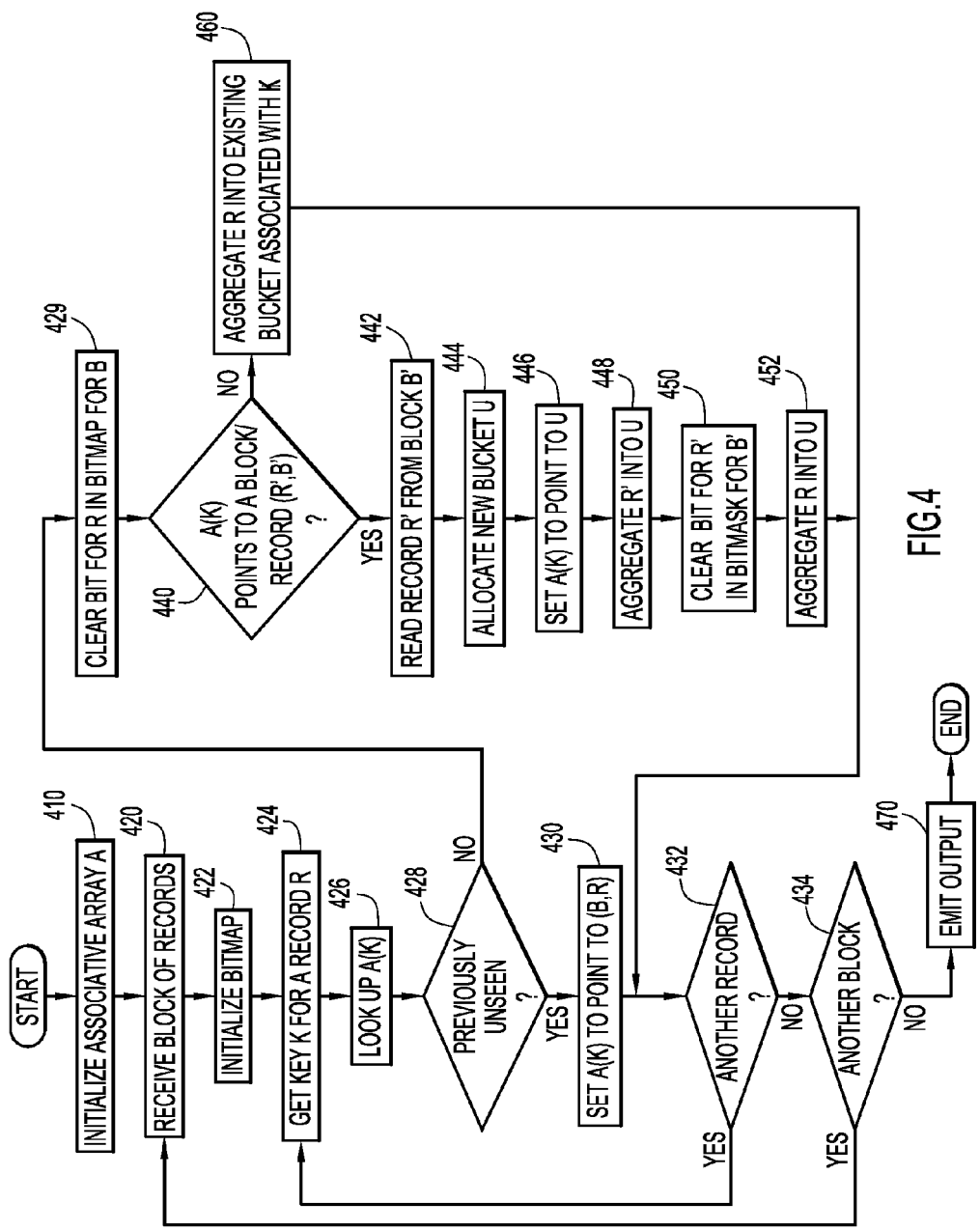
FIG. 4 is a flow diagram illustrating an example manner of processing a grouping operation using record-level fallback according to an embodiment of the present invention.

According to another embodiment of the present invention, records that belong to non-singleton groups may be aggregated without triggering aggregation of all records in their data block. An example manner of processing a grouping operation using record-level fallback (e.g., via grouping module 114 and processor 20 of server system 110) according to an embodiment of the present invention is illustrated in FIG. 4. The grouping module initializes associative data structure 230 at step 410, and receives a data block 210 as discussed with respect to FIG. 3. At step 422, the grouping module prepares a bitmap (or other data structure) with bits (or other elements) corresponding to the records of the data block. Initially, all of the bits are set to indicate that none of the input records in the data block have been processed into aggregation records.

The grouping module obtains the grouping key K for a record R in the current data block B at step 424, and looks up the corresponding element A(K) in the associative data structure at step 426. At step 428, the grouping module determines whether K is a previously unseen grouping key. For example, the grouping module may determine whether the element A(K) indicates that information (e.g., a reference to an input record in a data block, or a reference to an aggregation bucket) has been entered for the key K. If no information has been entered, the grouping key is previously unseen, and the grouping module sets A(K) to refer to the current data block and record (B,R) at step 430. At step 432 the grouping module determines whether another record remains to be considered in the current data block. If so, processing returns to step 424, otherwise processing proceeds to step 434, and the grouping module determines whether another data block remains to be processed. If so, processing returns to step 420. The grouping module retains the received data blocks and their corresponding bitmaps. If no data blocks remain to be processed, the grouping module emits output at step 470.

If the grouping module determines that the key K has been previously seen (e.g., if A(K) indicates that information has been entered for key K) at step 428, the grouping module clears the bit for input record R in the bitmask for data block B at step 429. At step 440, the grouping module determines whether A(K) refers to another data block 210 (B') and input record (R'). If not, A(K) refers to an existing aggregation bucket 242, into which the grouping module aggregates input record R at step 460, and proceeds to step 432. Otherwise, the grouping module reads R' from block B' at step 442, allocates a new aggregation bucket at step 444, sets A(K) to point to the new bucket at step 446, aggregates the input record R' into the new bucket at step 448, clears the bit corresponding to R' in the bitmask for data block B' at step 450, and aggregates input record R into the new bucket at step 452. Processing then proceeds to step 432 for the next record.

At step 470, the grouping module may emit aggregated output in the manner described with respect to FIG. 3 and non-aggregated output comprising each received data block and its corresponding bitmap. These data blocks may include input records belonging to non-singleton groups. A cleared bit in the bitmask for a data block indicates that the corresponding input record is represented in the aggregated output, and therefore is to be ignored in the non-aggregated output.

In other words, a bitmap is maintained for each stride which has been found to have at least one duplicate record. The bitmap initially has a presence bit set for each record. When a duplicate is found, that record is processed into an aggregation record and the presence bit is cleared. At the end of processing, the presence bits may be encoded as run lengths, and applied to the original data block according to a compression scheme that includes run length encoding. As a result, the amount of aggregation performed depends upon the number of non-singleton input records, rather than the number of data blocks containing non-singleton records.

It will be appreciated that the embodiments described above and illustrated in the drawings represent only a few of the many ways of implementing embodiments for processing group-by operations.

The environment of the present invention embodiments may include any number of computer or other processing systems (e.g., client or end-user systems, server systems, database accelerator appliances, etc.) and storage systems, arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., database software, communications software, etc.). These systems may include any types of monitors and input devices (e.g., keyboard, mouse, voice recognition, touch screen, etc.) to enter and/or view information. For example, a present invention embodiment may operate in a massively parallel computer environment (e.g., a database accelerator system in which a symmetric multiprocessor host system distributes tasks to and combines results from parallel blade servers with associated storage devices and data subsets). In this environment, group-by operations may be performed in two stages: first local grouping of available local data, then a global redistribution of data (with location determined by the grouping keys), and finally a second stage of grouping and aggregation. In this environment, grouping in the manner of present invention embodiments may be applied to either the first or second stages, or both.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, intranet, Internet, hardwire, modem connection, wireless, etc.). For example, the functions of the present invention embodiments may be distributed in any manner among various server systems, end-user/client and/or any other intermediary processing devices including third party client/server processing devices. The software and/or algorithms described above and illustrated in the flow charts may be modified in any manner that accomplishes the functions described herein. In addition, the functions in the flow charts or description may be performed in any order that accomplishes a desired operation.

The communication network may be implemented by any number of any types of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of data storage systems and structures to store information. The data storage systems may be implemented by any number of any conventional or other databases, file systems, caches, repositories, warehouses, etc.

The present invention embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, touch screen, pen, etc.).

It is to be understood that the software of the present invention embodiments could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The present invention embodiments are not limited to the specific tasks, algorithms, parameters, data, or network/environment described above, but may be utilized for grouping information of any type (e.g., records of a relational database, non-relational database, document index, etc.) from any local or remote data sources (e.g., storage devices, processing systems, etc.). Data blocks may comprise any numbers of input records (e.g., (e.g., 0, 1, 20, 100, 1000, 5000, etc.) in any formats. Input records may have any numbers of fields, any combination of any number of which may define the grouping keys. Any type of associated data structures (e.g., hash table, linear array, binary search tree, etc.) may be used to group input record information, using any digests or hash functions (e.g., identity, linear, custom, cryptographic, etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system for performing a GROUP BY operation for a database query comprising:
    at least one processor and memory configured to perform:
    receiving one or more blocks of data elements, wherein each of the data elements comprises compressed information;
    assigning the data elements to groups to form one or more single-member groups and one or more plural-member groups, wherein the assigning of the data elements comprises:
        assigning a first data element of the data elements to a new group to form a single-member group and storing a pointer to a received block containing the first data element; and
        assigning a second data element of the data elements to an existing group to form a plural-member group, decompressing compressed information of data elements assigned to the plural-member group, and forming aggregated information for the plural-member group from the decompressed information;
    passing the aggregated information for each plural-member group for query processing; and
    passing the compressed information of the first data element of the single-member group for query processing.

2. The system of claim 1, wherein the GROUP BY is specified by a Structured Query Language statement containing a GROUP BY clause.

3. The system of claim 1, wherein a first block of data elements contains a data element belonging to the plural-member group, and the forming of the aggregated information for the plural-member group comprises forming aggregated information for each group having a data element in the first block of data elements.

4. The system of claim 1, wherein a first block of data elements comprises a data element belonging to the plural-member group, and the at least one processor and memory are further configured to perform:
    maintaining a presence indicator of each of the data elements within the first block; and
    removing the presence indicator for the data element having membership in the plural-member group.

5. The system of claim 4, wherein the passing of the compressed information comprises passing presence information and compressed information for each of the data elements of the first block.

6. The system of claim 1, wherein the assigning of the data elements to groups includes:
    applying data of the data elements of the received one or more blocks to an associative array to determine database object elements within a same aggregation bucket from among a plurality of aggregation buckets based on one or more aggregation keys specified by a query.

7. A computer program product for performing a GROUP BY operation for a database query comprising:
    a computer readable storage medium having computer readable program code embodied therewith for execution on a processing system, the computer readable program code comprising computer readable program code configured to be executed by the processing system to perform:
    receiving one or more blocks of data elements, wherein each of the data elements comprises compressed information;
    assigning the data elements to groups to form one or more single-member groups and one or more plural-member groups, wherein the assigning of the data elements comprises:
        assigning a first data element of the data elements to a new group to form a single-member group and storing a pointer to a received block containing the first data element; and
        assigning a second data element of the data elements to an existing group to form a plural-member group, decompressing compressed information of data elements assigned to the plural-member group, and forming aggregated information for the plural-member group from the decompressed information;
    passing the aggregated information for each plural-member group for query processing; and
    passing the compressed information of the first data element of the single-member group for query processing.

8. The computer program product of claim 7, wherein the GROUP BY is specified by a Structured Query Language statement containing a GROUP BY clause.

9. The computer program product of claim 7, wherein a first block of data elements contains a data element belonging to the plural-member group, and the forming of the aggregated information for the plural-member group comprises forming aggregated information for each group having a data element in the first block of data elements.

10. The computer program product of claim 7, wherein a first block of data elements comprises a data element belonging to the plural-member group, and the computer readable program code is further configured to be executed by the processing system to perform:
    maintaining a presence indicator of each of the data elements within the first block; and
    removing the presence indicator for the data element having membership in the plural-member group.

11. The computer program product of claim 10, wherein the passing of the compressed information comprises passing presence information and compressed information for each of the data elements of the first block.

12. The computer program product of claim 7, wherein the assigning of the data elements to groups includes:
    applying data of the data elements of the received one or more blocks to an associative array to determine database object elements within a same aggregation bucket from among a plurality of aggregation buckets based on one or more aggregation keys specified by a query.

* * * * *